US007249060B2

(12) United States Patent
Ling

(10) Patent No.: US 7,249,060 B2
(45) Date of Patent: Jul. 24, 2007

(54) SYSTEMS AND METHODS FOR DISTRIBUTING ON-LINE CONTENT

(75) Inventor: Marvin T. Ling, Scottsdale, AZ (US)

(73) Assignee: PayByClick Corporation, Scottsdale, AZ (US)

( * ) Notice: Subject to any disclaimer, the term of this patent is extended or adjusted under 35 U.S.C. 154(b) by 107 days.

(21) Appl. No.: 10/217,859

(22) Filed: Aug. 12, 2002

(65) Prior Publication Data

US 2004/0030615 A1 Feb. 12, 2004

(51) Int. Cl.
*G06Q 30/00* (2006.01)

(52) U.S. Cl. .......................................... 705/26; 705/27

(58) Field of Classification Search ............... 705/27, 705/26, 28, 64, 77, 51, 54, 57, 59
See application file for complete search history.

(56) References Cited

U.S. PATENT DOCUMENTS

| 4,802,218 | A |   | 1/1989  | Wright et al. |
| 4,816,824 | A | * | 3/1989  | Katz et al. ................. 340/5.86 |
| 4,977,595 | A |   | 12/1990 | Ohta et al. |
| 5,010,485 | A |   | 4/1991  | Bigari |
| 5,224,162 | A |   | 6/1993  | Okamoto et al. |
| 5,305,383 | A |   | 4/1994  | Guillou et al. |
| 5,539,825 | A |   | 7/1996  | Akiyama et al. |
| 5,655,023 | A |   | 8/1997  | Cordery et al. |
| 5,671,364 | A |   | 9/1997  | Turk |
| 5,815,657 | A |   | 9/1998  | Williams et al. |
| 5,832,089 | A |   | 11/1998 | Kravitz |
| 5,839,119 | A |   | 11/1998 | Krsul et al. |
| 5,850,442 | A |   | 12/1998 | Muftic |
| 5,872,844 | A |   | 2/1999  | Yacobi |
| 5,878,138 | A |   | 3/1999  | Yacobi |
| 5,889,860 | A | * | 3/1999  | Eller et al. ................... 705/51 |
| 5,897,622 | A |   | 4/1999  | Blinn et al. |
| 5,899,980 | A |   | 5/1999  | Wilf et al. |

(Continued)

FOREIGN PATENT DOCUMENTS

WO    WO 01/42946 A2    6/2001

OTHER PUBLICATIONS

Gennady Medvinsky, "NetCash: A Design for Practical Electronic Currency on the Internet," In Proceedings of the First ACM Conference on Computer and Communications Security, Nov. 1993.

(Continued)

*Primary Examiner*—Matthew S Gart
(74) *Attorney, Agent, or Firm*—Luce, Forward, Hamilton & Scripps LLP

(57) ABSTRACT

Systems and methods are provided for distributing content such as audio, video, and text files to users over a communications network such as the Internet. Content owners may store content items at content provider computers. A catalog provider computer may be used to host a catalog that lists the various content items available from the content owners. Vendors having vendor websites operating on vendor computers may view the content information in the catalog to determine which content items to offer on the websites. Users may select a desired content item to purchase at a vendor's website. When a user clicks on an appropriate purchase option, a micropayment service provider computer handles the purchase transaction. The purchased content item may then be delivered to the user from an appropriate one of the content provider computers.

31 Claims, 10 Drawing Sheets

U.S. PATENT DOCUMENTS

| | | | |
|---|---|---|---|
| 5,900,564 A * | 5/1999 | Kurakake | 84/477 R |
| 5,920,861 A * | 7/1999 | Hall et al. | 707/9 |
| 5,930,777 A | 7/1999 | Barber | |
| 5,943,423 A | 8/1999 | Muftic | |
| 5,943,424 A | 8/1999 | Berger et al. | |
| 5,963,924 A | 10/1999 | Williams et al. | |
| 5,966,699 A | 10/1999 | Zandi | |
| 5,982,891 A | 11/1999 | Ginter et al. | |
| 5,983,207 A | 11/1999 | Turk et al. | |
| 5,999,919 A | 12/1999 | Jarecki et al. | |
| 6,018,720 A | 1/2000 | Fujimoto | |
| 6,047,268 A | 4/2000 | Bartoli et al. | |
| 6,236,972 B1 | 5/2001 | Shkedy | |
| 6,236,981 B1 | 5/2001 | Hill | |
| 6,341,273 B1 | 1/2002 | Briscoe | |
| 6,385,596 B1 * | 5/2002 | Wiser et al. | 705/51 |
| 6,449,601 B1 | 9/2002 | Friedland et al. | |
| 6,473,500 B1 | 10/2002 | Risafi et al. | |
| 6,473,740 B2 * | 10/2002 | Cockrill et al. | 705/27 |
| 6,493,683 B1 | 12/2002 | David et al. | |
| 2001/0029496 A1 | 10/2001 | Otto et al. | |
| 2002/0002545 A1 | 1/2002 | Resneck | |
| 2002/0108050 A1 * | 8/2002 | Raley et al. | 713/193 |
| 2002/0133413 A1 * | 9/2002 | Chang et al. | 705/26 |
| 2002/0156696 A1 * | 10/2002 | Teicher | 705/26 |
| 2003/0120608 A1 | 6/2003 | Pereyra | |
| 2003/0145234 A1 | 7/2003 | Stangel | |
| 2004/0093273 A1 * | 5/2004 | Laurent et al. | 705/26 |
| 2006/0143690 A1 * | 6/2006 | Lin et al. | 726/2 |

OTHER PUBLICATIONS

Karen Rodriguez, "Toolkit Secures Internet Transactions," InfoWorld, 17(8):10, Feb. 20, 1995.

P. Neuman et al., "Requirements for Network Payment: The NetCheque™ Perspective," In Proceedings of IEEE Compcon '95, San Francisco, California, (Mar. 1995).

"The MilliCent Protocol for Inexpensive Electronic Commerce," In Published Proc. First USENIX Workshop on Electronic Commerce, (Jul. 1995) URL: http://www.millicent.digital.com/works/details/papers/millicent-w3c4/millicent.html, printed Oct. 25, 2001.

Dave Koslur, "Buying Data Bit by Bit with Microcash: New Technology Lets Internet Users Pay as They Go," PC Week, 13(34), Aug. 26, 1996.

O'Mahony et al., "Electronic Payment Systems," The Artech House Computer Science Library, pp. 191-212, Jun. 13, 1997.

Rafael Hirschfeld (Ed.), "FC '97 Papers," In Proceedings First Int'l Conference on Financial Cryptography, (Feb. 1997) URL: http://www.arraydev.com/commerce/jibc/9704-30.htm.

Peter Wayner, Digital Cash, 2nd Edition: Commerce on the Net, Chapter 22 "Magic Money" (AP Professional, London (1997)) pp. 241-248.

Mark Manasse, "The MilliCent Microcommerce System," DIGITAL Systems Research Center Technical Presentation, Palo Alto, California (Jul. 1997) URL: http://www.millicent.digital.com/works/details/presentations.html.

"Wave Systems and IBM to Collaborate on Technology for Accessing Digital Content," Bus. Wire, Dec. 18, 1997.

Warren Cohen, "Online Malls Move Closer to Home", U.S. News & World Report, 123(21):86, Dec. 1, 1997.

M. Bellare et al., "Variety Cash: A Multi-Purpose Electronic Payment System," Proc. Third Usenix Workshop on Electronic Commerce, Extended Abstract, (Jun. 1998).

"Transmedia Europe, Inc. and . . . announce the acquisition on Silicon Valley Internet . . . ", PR Newswire, Jul. 16, 1998.

J. Nielsen, "The Case for Micropayments," (Alertbox, Jan. 1998), URL: http://www.useit.com/alertbox/980125.htm I, printed Oct. 23, 2001.

"Common markup for Ecash per-fee-links," (Ecash.com adapted version of W3C working draft of Aug. 25, 1999), URL: http://www.ecash.com/MicroPayment/micropayment.htm, printed Sep. 28, 2001.

"Common Markup for micropayment per-fee-links," (W3C Final Public Working Draft of Aug. 25, 1999, URL: http://www.w3.org/TR/WD-Micropayment-Markup.html/ , printed Oct. 16, 2001.

"Network Payment Mechanisms & Digital Cash," URL: http://inf2.pira.co.uk/top033.htm , printed Oct. 20, 2000.

"Micropayment Methods," URL: http//www.transaction.net/payment/micro.html, printed Oct. 20, 2000.

"Internet Dollar is the money of the Internet," Internet Dollar Ltd., URL: http://www.internetdollar.com , printed Oct. 20, 2000.

"What is eCoin Micropayment System?" eCoin Incorporated , URL: http://www.ecoin.net printed Oct. 20, 2000.

"A Plan for the Introduction of Internet Cash," URL: http://www.jim.com/jamesd/kong/plan.html, printed Oct. 20, 2000.

Michael Peirce, "Payment Mechanisms Designed for the Internet," URL: http://ganges.cs.tcd.ie/mepeirce/Project/oninternet.html, printed Oct. 23, 2000.

"Small Change: Micropayment," Computerworld 2000, URL: http://www2.computerworld .com /home/features.nsf/AI1/980223micropaylinks, printed Oct. 23, 2000.

Michael Peirce and Donal O'Mahony, "Scaleable, Secure Cash Payment for WWW Resources with the PayMe Protocol Set," URL: http://ganges.cs.tcd.ie/rnepeirce/Project/Payme/Overview.html , printed Oct. 23, 2000.

Don Tapscott, "The Web Doesn't Have to Shut Out the 'small Stuff,'" Computerworld, Inc. (Nov. 2000), URL: http://www.computerworld.com/cwi/story/0,11991NAV47-81 STO54155,00.html, printed Oct. 17, 2001.

Don Tapscott, "Giving a Lift to Micropayments," Computerworld, Inc. (2000), URL: http://www.computerworld.com/cwi/story/0,1199,NAV47-68-86-1721_STO55261,00.html, printed Oct. 17, 2001.

Jean-Marc Huijskens, "Cartio Micropayments Whitepaper," Net. Actuals B.V., May 2001.

"Clickshare: Connecting Customers with Content," Clickshare Service Corp. URL: http://www.clickshare.com/aboutus/, printed Oct. 17, 2001.

"The Magex Solution FAQs," Magex Limited (2000), URL: http://www.magex.com/magexsolution/overview/faqs.asp, printed Oct. 17, 2001.

Eric J. Lerner, "Security Makes 'Net Gains'" IBM Think Research, URL: http://domino.research.ibm.com/comm/wwwr_thinkresearch.nfs/pages/security196.html printed on Oct. 17, 2001.

Michele Pepe, "Start-Up Expands Payment Options", CRN (Aug. 2000) URL: http://www.enition.com/press/content_3.html, printed Oct. 17, 2001.

"QPASS Commerce Solutions for Wireless Carriers", Qpass, Inc.; URL: http://www.qpass.com/default.asp?pid=wirelesscarriersolutions; http://www.qpass.com /default.asp?pid=products; http://www.qpass.com/default.asp?pid=customerspartners, printed on Oct. 17, 2001.

Renee Boucher Ferguson, "Pay-as-you-go Transactions", eWEEK (Nov. 2000); URL: http://techupdate/zdnet.com/techupdate/stories/main/0,14179,2657472,00.00.html printed on Oct. 17, 2001.

Doug Bedell, "Pay-per-click Micropayments May Become the Norm on the Net," The Dallas Morning News (Nov. 19, 2000) URL: http://www.dallasnews.com/technology/218421, micropayments.html , printed Nov. 1, 2001.

"RocketCash—HowItWorks—FAQs" RocketCash, LLC, URL: http://www.rocketcash.com/howitworks/index.php?page=frequently_asked_questions, printed Mar. 1, 2002.

* cited by examiner

SYSTEMS AND METHODS FOR DISTRIBUTING ON-LINE CONTENT

BACKGROUND OF THE INVENTION

This application relates to selling and distributing on-line content, and more particularly, to selling and distributing content such as songs, videos, and text using micropayment schemes.

Various subscription-based approaches have been used to distribute content on the Internet. With a subscription-based approach, a customer may pay a monthly fee for a service that provides access to a library of on-line content such as downloadable songs. Although the monthly fee may be relatively modest, the fee and the effort involved in subscribing to the service may deter casual or occasional users. Moreover, because of fragmentation in the content industry, users who desire to purchase content are often faced with subscribing to numerous different services, which further increases the burden on the user.

Micropayment schemes have been proposed in which on-line users are billed on a per-item basis for each separate item of content that is downloaded.

It is an object of the present invention to provide improved micropayment arrangements for distributing on-line content.

SUMMARY OF THE INVENTION

This and other objects of the invention are accomplished in accordance with the principles of the invention by providing a system in which content owners may list their content in a content catalog maintained on a catalog provider computer by a catalog provider. The content owners may store the content items on their own computers, on catalog provider computers, or third party computers.

The catalog may be accessed by the content owners (e.g., when the content owners desire to edit titles, descriptions and prices associated with various content items). The content owners may also adjust which vendors are authorized to sell particular content items.

Vendors may access the catalog to select which of the various content items they will offer for sale on their vendor websites. Vendor computers that are used to host the vendor websites may communicate with the catalog provider computer and content provider computers over a communications network such as the Internet.

Users at user devices may purchase content over the communications network. The content items that are purchased may be downloaded in the form of files (e.g., song files or articles) or may be downloaded in real time (e.g., in the form of a stream of data).

A micropayment service provider may provide a micropayment service using a micropayment service provider computer that communicates with the users and vendors over the communications network. Users may deposit funds at user accounts maintained by the micropayment service provider computer.

The micropayment service may support the purchase of content items at relatively small per-item prices. For example, the micropayment service may allow a vendor to offer a song, article, or multimedia file for a price of less than one dollar (e.g., 5 cents). The user need not subscribe with multiple vendors in order to purchase content items from different vendor websites. Rather, the user may use the account at the micropayment service provider computer to make purchases at each of the different vendors.

Vendors offer content items for sale. When a user selects a desired content item (e.g., by clicking on an associated web link or other user-selectable option), the micropayment service provider computer will check whether the user has sufficient funds (or credit) in the user's micropayment service provider account to cover the purchase. If the user has sufficient funds, authentication information is generated that may be used by the content provider computer to validate the transaction prior to delivering the desired content item to the user. The vendor may be charged a per-item service fee by the micropayment service provider computer for handling the purchase transaction or the vendor may be charged by the micropayment service provider computer using any other suitable arrangement.

The micropayment service provider may pay a portion of the revenue that is collected from users to the content owners in the form of a royalty. Information on royalty rates and royalty payments may be stored in content owner databases and some or all of this information may also be stored at the catalog provider computer or micropayment service provider computer.

Content owners may secure their content using a content wrapping tool. When a user downloads a wrapped content item, the user must seek authentication with the micropayment service provider before the user may access (view or play) the content item. To secure content items by wrapping, content items may be provided with wrapper software (e.g., a small computer program that is associated with the content) by the wrapping tool. The wrapper software (digital wrapper) is used during the authentication process to ensure valid authorization before displaying or playing the content item for the user (i.e., before allowing the user to access the content item). This approach prevents users from distributing content items to their friends for unauthorized free use.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
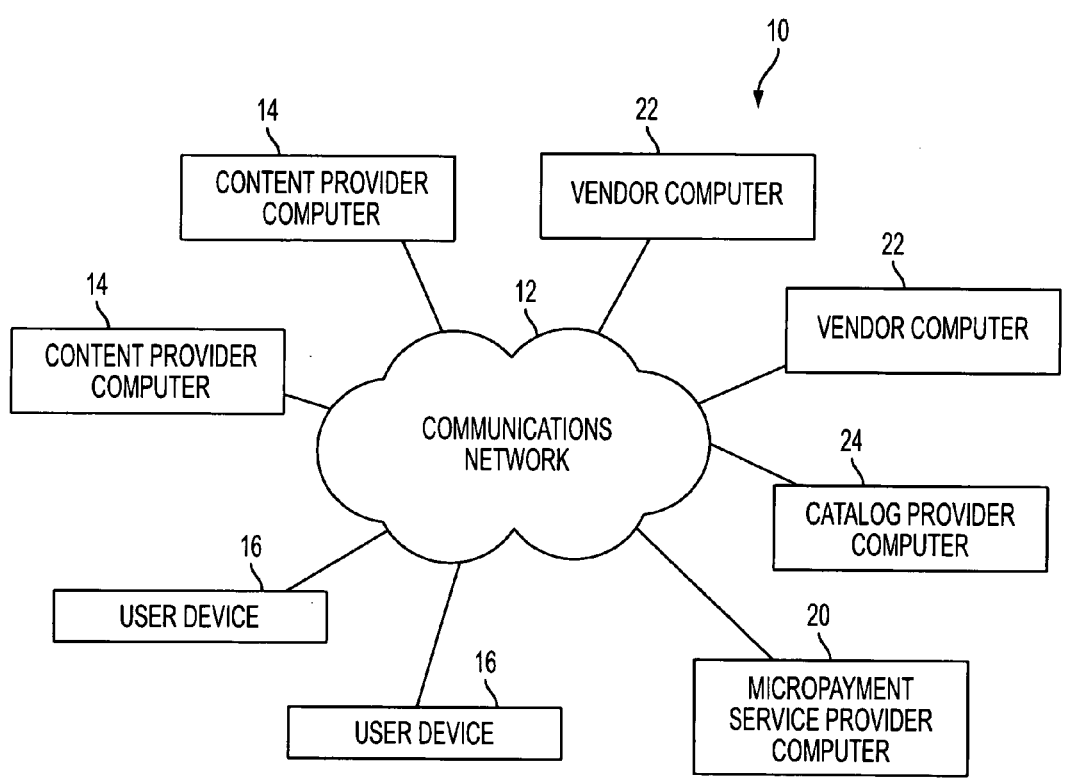
FIG. 1 is a simplified block diagram of an illustrative system for distributing on-line content in accordance with the present invention.

An illustrative system 10 for distributing online content in accordance with this invention is shown in FIG. 1. System 10 may be used for distributing any suitable type of downloadable content such as text files (articles, books, etc.), music files (e.g., songs, albums, audio books, etc.), videos (e.g., movies, video clips), multimedia content (e.g., content that includes multiple types of text, audio, and video), or any other suitable content.

The various entities in system 10 may communicate using communications network 12. Communications network 12 may be based on the Internet, local area networks, wide area networks, private networks, or any other suitable networks that support communications between different parties located at respective computers or other suitable electronic devices.

In the arrangement of system 10, content may be owned by multiple content owners (e.g., record companies, movie studios, publishing companies, or online newspapers). The content that is owned by the content owners may be housed on content provider computers 14. Content provider computers 14 may, for example, be computers on which content servers are implemented. Content provider computers 14 may be located at any suitable location in system 10. For example, content provider computers 14 may be located at the facilities of the content owners or at third-party hosting sites. An advantage of hosting content using content provider computers 14 that are located at the content owners or under their direct control is that this may help to ensure the security of the content is maintained to the satisfaction of the content owners.

Users may use user devices 16 to access content on content provider computers 14 over communications network 12. Content may be accessed in real time (e.g., as a content stream) or may be accessed by downloading a file.

User devices 16 may be desktop or notebook personal computers, personal digital assistants, wireless telephones, or any other suitable user devices.

Users may purchase content from multiple vendors without purchasing subscriptions. Rather, a micropayment service may be provided that allows users to pay a small amount for each item of content that is downloaded. As an example, a user may pay less than one dollar (e.g., $0.01 or $0.10 or a comparable amount in another suitable currency) for access to a newspaper article or a song. This type of pay-per-item capability makes system 10 attractive to users. A micropayment service provider computer 20 may be used to support the micropayment service. The capabilities of computer 20 may be provided by one or more computers.

For clarity, the features of the micropayment service are generally described herein in the context of a single computer 20.

The point-of-sale for most users of system 10 is an on-line vendor. Vendors can sell content to the users using vendor computers 22. The on-line vendors may provide websites using computers 22 at which the users may purchase content. Vendor computers 22 may be operated by the on-line vendors or may be operated by third parties from whom the vendors purchase computer services.

The content may be offered for sale using any suitable approach. For example, one vendor may provide an on-line music store in which users may browse for songs by their favorite artists. Another vendor may offer a news site where archived articles are available for purchase. Yet another vendor may provide an on-line magazine that allows users to purchase articles, songs, or video clips. Because of the diversity of vendor sites that may be provided, content owners are able to widely distribute their content.

In order to facilitate the distribution of their content through appropriate vendors, the content owners may list the content that is available for the vendors to sell using an on-line catalog. Other information may also be included in the catalog database, such as information on which vendors are authorized to sell certain content items, royalty information, sales data, content descriptions, etc. The content catalog may be implemented using a catalog provider computer 24. Catalog provider computer 24 may be operated by a content owner, a third-party catalog provider, a micropayment service provider, or any other suitable entity. For clarity, the present invention will be described primarily in the context of an arrangement where the content catalog is hosted by a catalog provider operating a stand-alone catalog provider computer 24. This is, however, merely illustrative. Any suitable computer equipment may be used to support the catalog features of the invention if desired.

Before the equipment of system 10 may be used to distribute content to users, the entities involved should establish appropriate contractual relationships and register with the system. The user registration process is preferably simplified, so that the user may only need to register once (on making an initial purchase), even if the user ultimately purchases content from many different vendors. The registration processes that are used by the content owners, catalog provider, vendors, and micropayment service provider are used to set-up relationships that allow appropriate information to be shared between these entities and that thereby allows the content distribution arrangement of system 10 to function properly.

Users may use system 10 to make small per-item payments ("micropayments") to purchase content offered by the vendors. The micropayment system may be implemented using micropayment service provider computer 20. The vendors act as retailers and receive a profit for each sale. Royalties are paid to the content owners in compensation for sale of their content. The micropayment service provider may receive compensation (per item sold or otherwise) in exchange for supporting the micropayment system. The content catalog is used to help content owners make their content available to appropriate vendors, so that the vendors may in turn offer this content for sale to the users. The content catalog provider may receive compensation for hosting the content catalog in any suitable form (e.g., the cost of operating the content provider computer may be shared by the content owners, etc.).

The flow charts of FIGS. 2-6 illustrate various aspects of the operation of system 10 from the perspectives of the content owners, catalog provider, micropayment service provider, vendors, and users.

Figure 2:
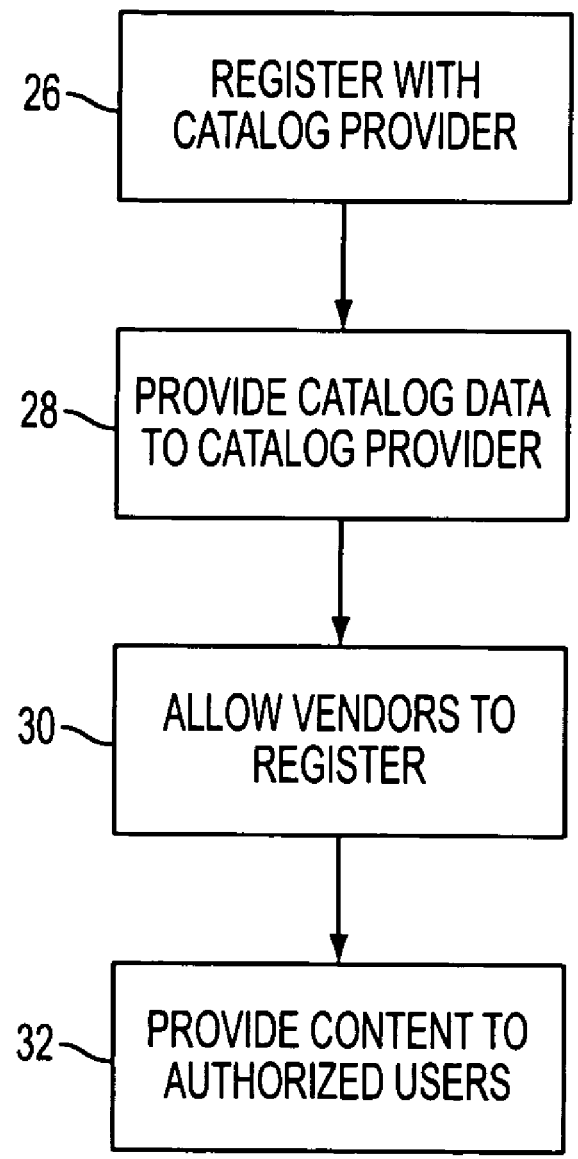
FIG. 2 is a flow chart of illustrative steps involved when a content owner interacts with the system of FIG. 1 in accordance with the present invention.

Illustrative steps involved when a content owner interacts with system 10 are shown in FIG. 2. At step 26, the content owner may register with the catalog provider. For example, the catalog provider computer may be used to provide an on-line registration form. A content owner may use a suitable computer such as one of content provider computers 14 to access the form. The registration process (in this step and in the other registration steps described herein) may involve setting up a username and password or other information that allows the parties to perform a suitable authentication process. Following registration, the content owner may log in to the catalog provider computer using the authentication information that was established during step 26.

When the content owner has logged in with the catalog provider, the content owner may provide catalog data to the catalog provider at catalog provider computer 24 at step 28. The content owner may, for example, provide information to the catalog provider that includes a content identifier (content ID) that uniquely identifies the song file or other content item, an owner identifier (owner ID), a preferred or required currency to be used in purchasing the content (e.g., yen or dollars), a top-level URL (universal resource locator) that is associated with content provider computer 14 for that content owner, title information (e.g., a song title), a brief description of the content (e.g., a bio of the artist, a description of the song, etc.), a suggested retail price for the content, (optionally) the maximum number of times that a given user may view (listen to or otherwise use) the content before the user's license to the content expires, (optionally) an expiration date (including day, month, year, time, etc.) at which the user's license to the content expires, and royalty terms (e.g., a fixed royalty amount, a percentage charge to be levied based on the suggested list price or actual sale price, combinations of such royalty amounts, an amount based on whichever calculated rate is lower or greater, etc.).

This catalog information may be adjusted by the content owner. If desired, some of the information that is provided to the catalog provider by the content owner may be extracted by the catalog provider (e.g., during interactions with the content owner), so that the content owner need not provide this information directly. As one example, the owner ID may be deduced by the catalog provider once the owner logs in to the system, so the content owner need not necessarily be required to explicitly provide this information during a session in which catalog content is being provided to the catalog provider computer.

Some of the content catalog data that is provided by the content owner to the catalog provider may be used to provide information to users regarding the content that is available for purchase. For example, information on the content title, description, content ID, content genre, content provider computer top-level URL, and suggested list price may be used to provide users with a web-based catalog or list of available content. The content catalog or list may also include information (e.g., selectable web links or company names) that identifies which vendors offer the content for retail sale. This arrangement allows users to browse the content list for a desired song title (or other content label) and to easily locate a vendor that is available to consummate the purchase transaction.

Catalog provider computer 24 may also be provided with information at step 28 that identifies which vendors are allowed to sell particular titles or types of content. This may be useful, for example, if a content owner wishes to sell new releases through one vendor or type of vendor and wishes to sell older titles through other vendors or other types of vendor. Vendor-specific data in the catalog database may be provided by the content owner, by one or more vendors, by a suitable third party, or a combination of these sources of other suitable sources.

Vendor-specific data that is stored by catalog provider computer 24 (either in the catalog or in a related database) may include a vendor identifier (vendor ID), content identifiers associated with that vendor, records of what content has been sold through each vendor, records of royalty payments that have been made by the vendors, etc. With this information, and the content-specific information in the content catalog, a content owner can generate reports and accounting statements that reflect their total content sales, sales by vendor, sales by content genre, accrued royalty payments, etc. These are merely examples of the types of data analysis routines that may be performed on the content catalog database information. Any suitable data analysis routines may be performed if desired.

The information that is provided from the content owner to the catalog provider at step 28 may be entered manually (e.g., by allowing content owner personnel to interact with selectable web page options) or may be provided using a file upload service (e.g., a file upload arrangement that allows the content owner to send a database file to the catalog provider in an appropriate format (e.g., XML, CSV, etc.).

At step 30, content provider computers 14 or other suitable computers may be used to allow the vendors to register with the content owners. The registration process may involve setting up authentication information that allows the content owners to verify the identity and trustworthiness of the vendors before the content owners make content available to the vendors and their customers.

At step 32 (after a user has purchased a content item), the content may be provided to the user by the content owner. For example, a server on each content provider computer may be used to allow users to receive streaming content or content file downloads.

Content provider computers 14 preferably contains content records. The content records may include the content items to be streamed to the users or downloaded as files by the users in association with user content purchases. The content items may be provided in the form of music or video files or text articles or other suitable files or data structures. The content records may include content identifier information for each content item.

The transaction database at the micropayment service provider may include transaction identifiers (transaction IDs) that identify each transaction, vendor identifiers (vendor IDs) that identify the vendor associated with each sale (transaction), content identifiers (content IDs) that identify the content items for each transaction, encrypted user identifier (user ID) information to avoid allowing unauthorized users to access the content, royalty payment information, date and time information associated with transactions, etc. When a user attempts to access content in content provider computer 14 at step 32, the content provider computer may authenticate the user with the micropayment service provider's computer and (if the user is authenticated) may provide the user with the appropriate content item (or items) over communications network 12.

The content owner computer equipment that is used to provide content to users at step 32 (e.g., computer equipment including a content server) may or may not use different equipment from the content owner computer equipment used to allow the content owner to upload, edit, and maintain the catalog entries associated with the catalog on catalog provider computer 24. The content owner equipment that is used to deliver content and the content owner equipment that is used to interact with the catalog may sometimes be collectively referred to herein as content provider computer 14.

Figure 3:
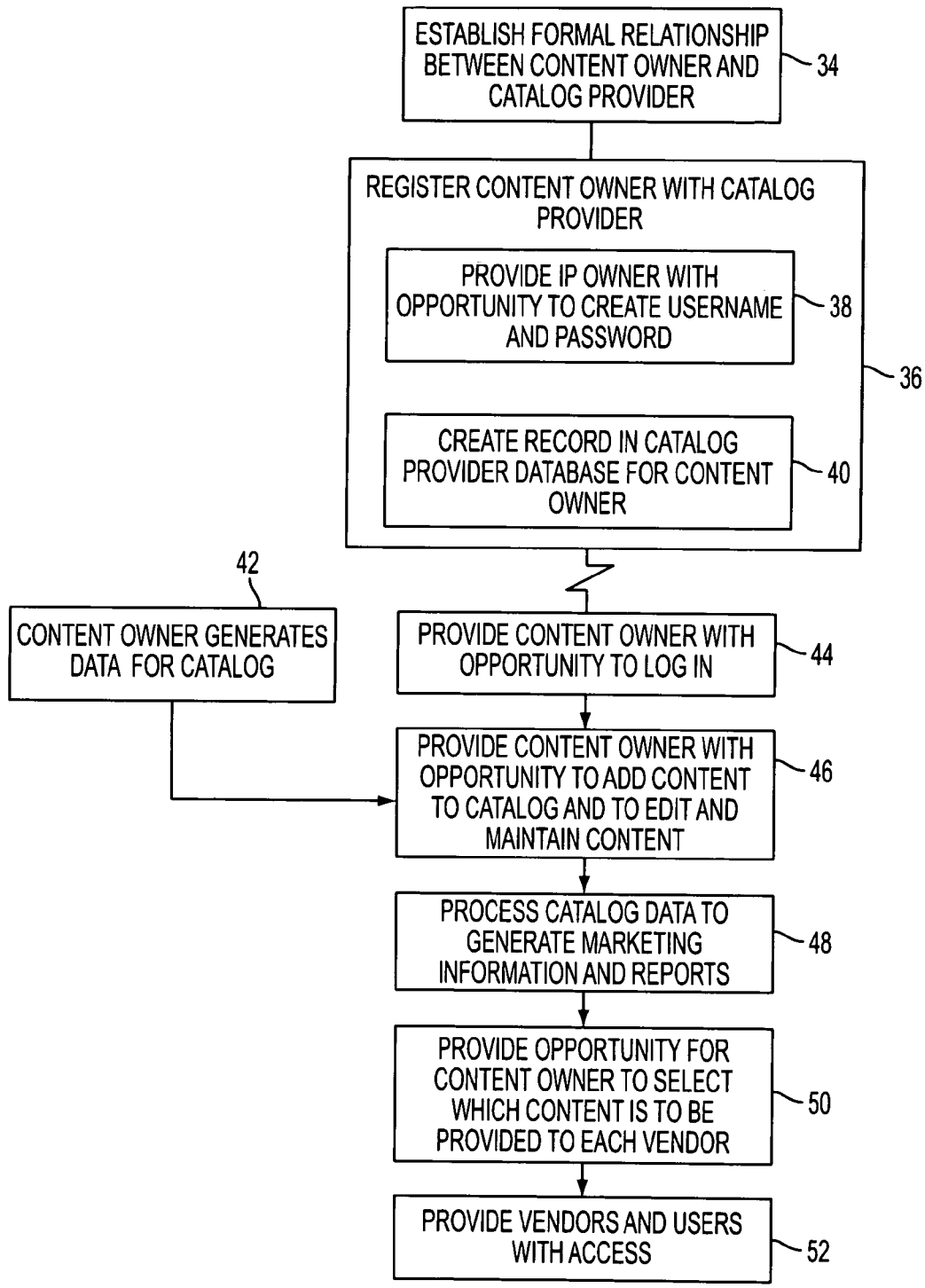
FIG. 3 is a flow chart of illustrative steps involved when a catalog provider interacts with the system of FIG. 1 in accordance with the present invention.

Illustrative steps involved when a catalog provider interacts with system 10 are shown in FIG. 3. At step 34, the catalog provider may establish a formal relationship with a content owner. The catalog provider may, for example, sign a written contract with the content owner or catalog provider computer 24 and content provider computer 14 may be used to consummate an on-line agreement. The formal agreement or contract that is established at step 34 may govern the terms under which content information will be listed in the content catalog on catalog provider computer 24 and other aspects of the relationship between the content owner and catalog provider.

Once the content owner and catalog provider have exchanged sufficient information to trust each other, the content owner may be provided with an opportunity to register with the catalog provider at step 36. For example, catalog provider computer 24 may provide the content owner (e.g., a content owner at content provider computer 14) with on-line access to an application that allows the content owner to set up a username and password at step 38 and to create an associated content owner record in the catalog provider database on computer 24 at step 40. The content owner record may be used to maintain database information on which content is associated with the content owner and may be used to maintain information on the attributes of that content.

As shown by step 42, content owners may use content provider computers 14 to create data for their content. The data may, for example, include information such as titles, descriptions, content identifiers, and the other information described in connection with step 28 of FIG. 2. This data may be updated continuously as new content is created and added to the library of content owned by the content owner.

Whenever the content owner desires to update the content catalog, the content owner may log in to catalog provider computer 24, as shown by step 44 of FIG. 3. The log-in procedure may involve using the username and password information or other suitable authentication information generated at step 36 to authenticate the content owner.

At step 46, after the content owner has logged in to catalog provider computer 24 at step 44, catalog provider computer 24 may provide the content owner with an opportunity to upload the catalog data generated at step 42. Catalog provider computer 24 may also provide the content owner with the ability to edit and maintain the catalog being provided by the catalog provider computer. The content owner may, for example, change the descriptions associated with certain content items, may update price information, may add or remove vendors from the list of vendors approved to offer certain content items for sale, etc. By allowing the content owner to change information in the catalog, the catalog database maintenance functions of the present invention allow the content owner to change which content they are offering for wholesale distribution to the vendors and to change the wholesale price, suggested list price, approved vendors, royalty terms, etc.

These are merely illustrative examples of the types of actions that catalog provider computer may allow the content owner to perform. In general, any suitable database maintenance functions may be provided to the content owner. For example, at step 48, catalog provider computer 24 may process the catalog data (autonomously or at the direction of the content owner or catalog provider). The processed data may be used as marketing information and may, if desired, be provided as reports. The processed data may therefore be used by the content owner to adjust their prices or distribution scheme to enhance profits. As another example, at step 50, content provider computer 14 may be used to provide the content owner with an opportunity to select which content is to be made available for sale by each vendor. (This information may also be edited at step 46.)

At step 52, catalog provider computer 24 may provide vendors and users with access to the catalog information that has been created by the content owners. Vendors may access the catalog to view the terms and conditions associated with offering certain content for sale at their websites. For example, an on-line music vendor may view a list of new releases from a particular content owner and may use this information to decide which downloadable songs will be offered for sale at their website. As another example, an on-line music magazine may perform a search for available songs.

Because each vendor may have access to a different subset of content items, the catalog provider may or may not desire to make information on all content items available to all vendors. With one suitable approach, each vendor may view catalog information corresponding to content that is available for them to sell. With another suitable approach, each vendor may view the entire catalog, whether or not that vendor has authorization to sell the entire catalog's contents (e.g., even if a given vendor is restricted from offering a new release, etc.).

The users at user devices 16 may also access the catalog on catalog provider computer 24. For example, a user may browse the catalog to see what new releases are available from a favorite artist or content owner. When a content item of interest is located, the user may click on an appropriate option that directs that user to a list of vendors that stock that content item. Web links or other suitable on-line options may be used to direct the user to vendors that have desired content items in stock at their on-line stores.

The content catalog that is hosted by the catalog provider at catalog provider computer 24 therefore allows content owners to list content that is available for sale, allows vendors to obtain information on the terms under which the vendors may offer the items for sale, and, if desired, allows users to obtain information on which vendors have certain desired content available for sale.

If desired, catalog provider computer 24 may provide additional catalog features. For example, the catalog provider catalog may provide on-line entertainment or preview features, exclusive editorial content, etc. The catalog access and editing features of FIG. 3 may be provided using any suitable graphical user interface arrangement. For example, these features may be provided using a web-style graphical user interface or any other interface arrangement suitable for allowing content owners, vendors, and (optionally) users to interact with catalog provider computer 24 over communications network 12.

Micropayment service provider computer 20 of FIG. 1 may be used to allow users to purchase content items from vendors at vendor computers 22. Payment may be made in the form of tokens or cash. For clarity, the present invention will be described primarily in the context of purchase transactions involving currency. This is, however, merely illustrative.

Figure 4:
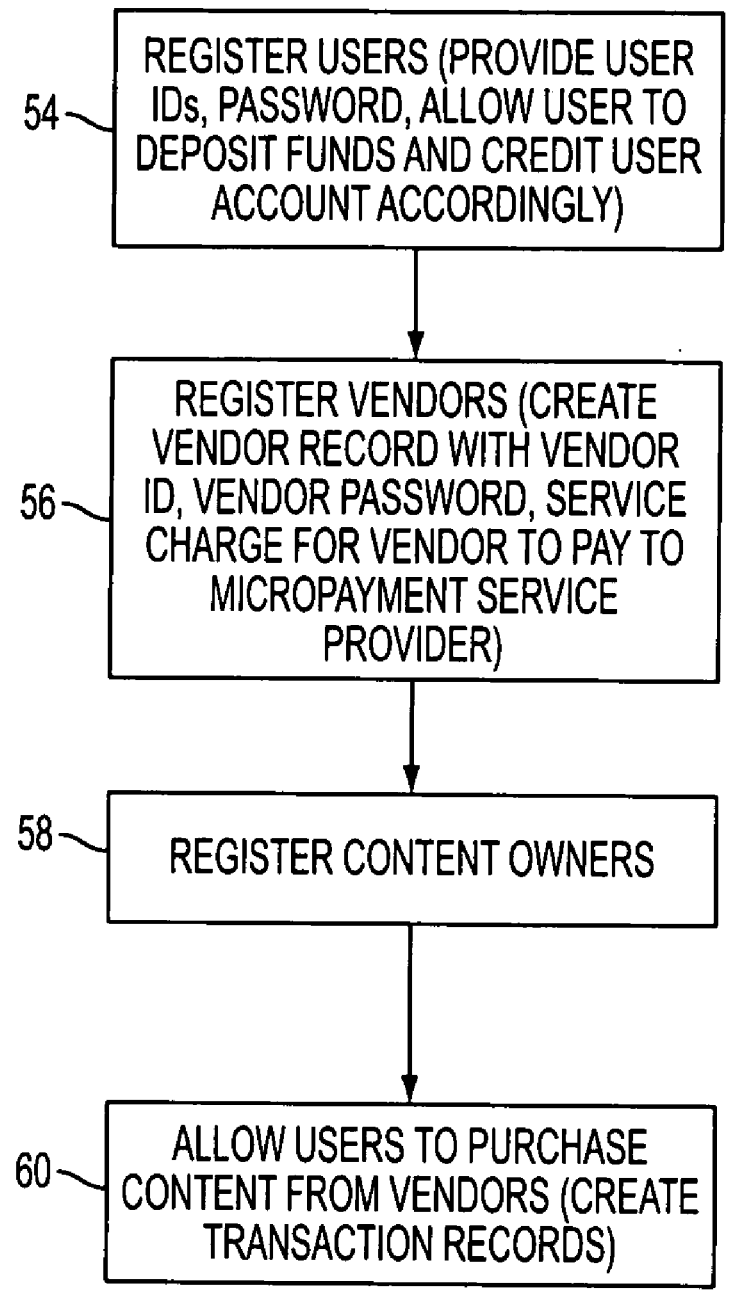
FIG. 4 is a flow chart of illustrative steps involved when a micropayment service provider interacts with the system of FIG. 1 in accordance with the present invention.

Illustrative steps performed by the micropayment service provider in interacting with system 10 are shown in FIG. 4. In a typical purchase transaction scenario, a user may attempt to purchase a desired content item from a vendor website. Micropayment service provider computer 20 may be used to maintain user accounts (e.g., accounts of cash funds). When the user clicks on an appropriate purchase button or link on the vendor website (e.g., a link that identifies the content of interest), the micropayment service provider determines whether the user has an existing account. If the user has an existing account, the account is debited and authentication information is generated for the user that the user may use when downloading the desired content from content provider computer 14. If the user has an existing account, but has insufficient funds in the account, the user may be provided with an opportunity to add funds to the account (e.g., to "top off" the account). Funds may be added to a user account using any suitable technique (e.g., by credit card, by transferring funds from an account at an Internet service provider, telephone company or other entity, by check, etc.). The micropayment service provider computer may allow the user to add funds in excess of the amount to be spent on any individual transaction, thereby reducing the "per transaction" cost of any service charges (e.g., service charges levied by the user's credit card company, Internet service provider, or other company).

If the user does not have an existing account with the micropayment service provider, the user may be provided with an opportunity to register at step 54. At step 54, micropayment service provider computer 20 may be used to provide the user with an on-line opportunity to register. For example, the user at user device 16 may be provided with an opportunity to deposit funds in an account that is maintained by the micropayment service provider. Funds may, for example, be deposited using a credit card, by transfer from an Internet service provider account, by transfer from an account associated with a telephone company or other entity, by check, etc. The micropayment service provider computer may allow the user to add funds in excess of the amount to be spent on any individual transaction, thereby reducing the "per transaction" cost of any service charges (e.g., service charges levied by the user's credit card company, Internet service provider, or other company). In establishing such an account, micropayment service provider computer 20 may be used to set up a username and password for each user, may be used to store information on the amount of funds each user has in their account, and may be used to credit and debit the user accounts in connection with purchase transactions (e.g., when the user purchases a song from a vendor).

In connection with step 54 and other user-related functions, the micropayment service provider may maintain a user database on micropayment service provider computer 20. The user database may contain user identifiers (user IDs) that identify individual users, vendor association information (e.g., information that identifies through which vendors the user sets up an account with the micropayment service provider), personal data (e.g., address information, e-mail information, purchase history information, etc.), user account information (e.g., available funds, incentives, payment method information), and user account activity history information. The user database may also include information on each transaction, such as vendor identifier (vendor ID) information identifying the vendor associated with each purchase, the purchase amount, and the date and time of each purchase.

At step 56, micropayment service provider computer 20 may be used to register a vendor. During the registration process of step 56, computer 20 may create a vendor record, may associate a vendor identifier (vendor ID) with a given vendor, may establish authentication information (e.g., a username and password) for the given vendor, may set up a vendor account, may apply a service charge to the vendor's account (in payment for the micropayment support services rendered by the micropayment service provider when handling user purchase transactions for the vendor), and may perform other suitable functions associated with registering vendors and maintaining vendor accounts. The information on the vendors may be stored in a vendor database maintained on micropayment service provider computer 20.

At step 58, the micropayment service provider may use micropayment service provider computer 20 to allow content owners to register with the micropayment service provider. During the registration process of step 58, each content owner may be provided with a username and password or other suitable authentication information. Once this authentication information has been established, content owners can log into micropayment service provider computer 20 to view sales data, account information (e.g., royalty payment information, etc.).

At step 60, micropayment service provider computer 20 may be used to support purchase transactions. In particular, micropayment service provider computer 20 may be used to handle purchase transactions that have been redirected to the micropayment service provider by vendor computers 22. Purchase transactions may be logged in a transaction database that the micropayment service provider maintains on micropayment service provider computer 20.

With the micropayment scheme of system 10, the user need not subscribe to multiple services to receive content items from multiple content owners. The user may purchase content items from multiple vendors and multiple content owners while making micropayments that affect only a single user account established at micropayment service provider computer 20 (or multiple accounts of this type if desired). This approach tends to simplify the purchase process and allows users to purchase a wide range of content without the complexities traditionally associated with such diverse purchases.

Figure 5:
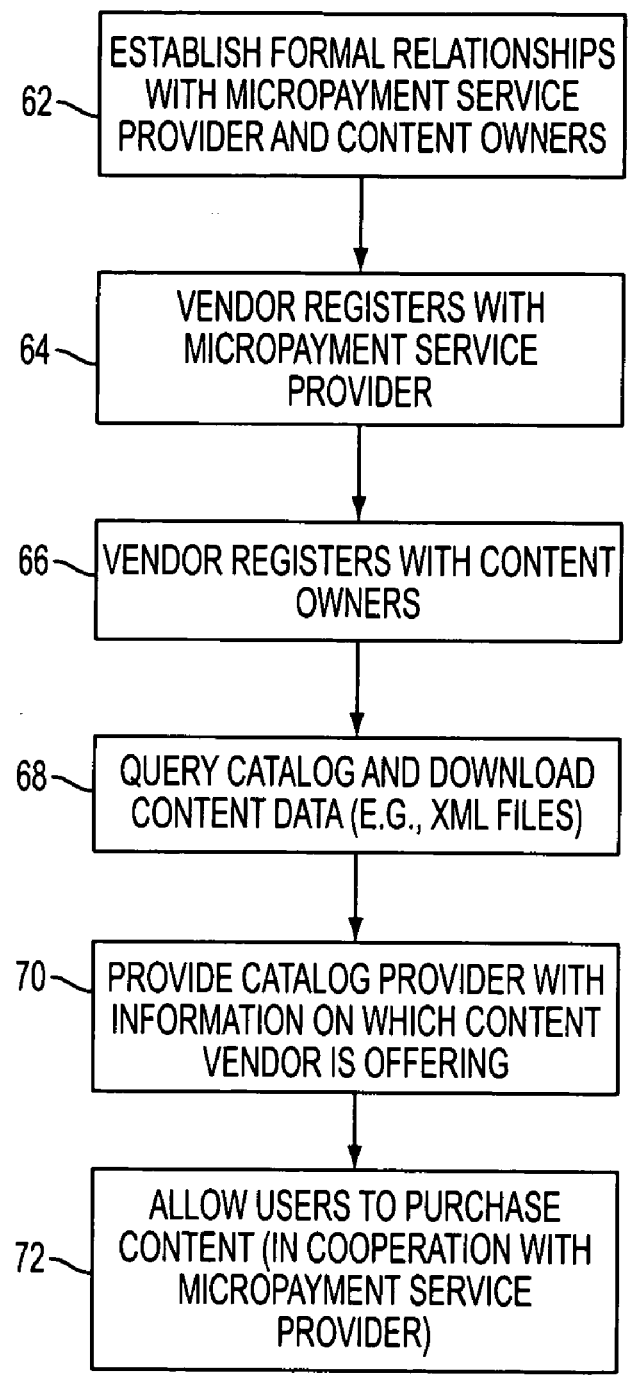
FIG. 5 is a flow chart of illustrative steps involved when a vendor interacts with the system of FIG. 1 in accordance with the present invention.

Illustrative steps involved when the vendors at vendor computers 14 interact with system 10 are shown in FIG. 5. At step 62, vendors may establish formal relationships with the micropayment service provider and the content owners. This may take the form of signed contracts or on-line agreements consummated over communications network 12 using vendor computers 22, micropayment service provider computer 20, and content provider computers 14. These agreements may set forth the terms of the relationships between the vendors and the content owners and the micropayment service provider. Once a basis for formal relationships have been established, the vendor may register with the micropayment service provider at a micropayment service provider computer 20 over communications network 12 at step 64. The vendor may also register with the content owner at content provider computer 14 over communications network 12 at step 66. The registration processes may be used to establish usernames and passwords or other suitable authentication information. A vendor may use this authentication information to access that vendor's account at the micropayment service provider (e.g., to view balance information). Registering with a content owner allows the content owner to assign certain content to the vendor. A content owner may, for example, allow a given registered vendor to sell new releases.

At step 68, the vendor may use vendor computer 22 to access the catalog on catalog provider computer 24. The vendor may, for example, search for information on new releases in a particular musical genre that is appropriate for sale at the vendor's website. The vendor may download catalog data in the form of XML (extensible markup language) files or any other suitable format. The downloaded catalog data may be used to manually or automatically incorporate new content offerings on the vendor's website. The content data from the catalog may also be used to adjust prices, provide content descriptions, provide logos, etc.

At step 70, the vendor may provide information on which content is being offered at the vendor's website to the catalog provider at catalog provider computer 24. Vendor computer 22 may, for example, be used to send a message or report to computer 24 that informs the catalog provider of the vendor's current offerings. By providing information on current offerings to catalog provider computer 24, this information may be made available to others in the form of a catalog or other suitable list or database. For example, information on the vendor's offerings may be provided over communications network 12 to users at user devices 16 who are interested in locating a vendor at which a particular content item is available.

At step 72, vendor computers 22 (working in conjunction with micropayment service provider computer 20) may be used to allow users to purchase content. A user may, for example, browse a vendor's website. When a particular content item of interest is located (e.g., in an on-screen web link), the user may click on that link to purchase the content item. Vendor computer 22 works with micropayment service provider computer 20 to debit the user's micropayment service provider account, to credit the vendor, to allow the user to download the content (or receive streaming access) from content provider computer 14, and to credit the content owner with an appropriate royalty.

Figure 6:
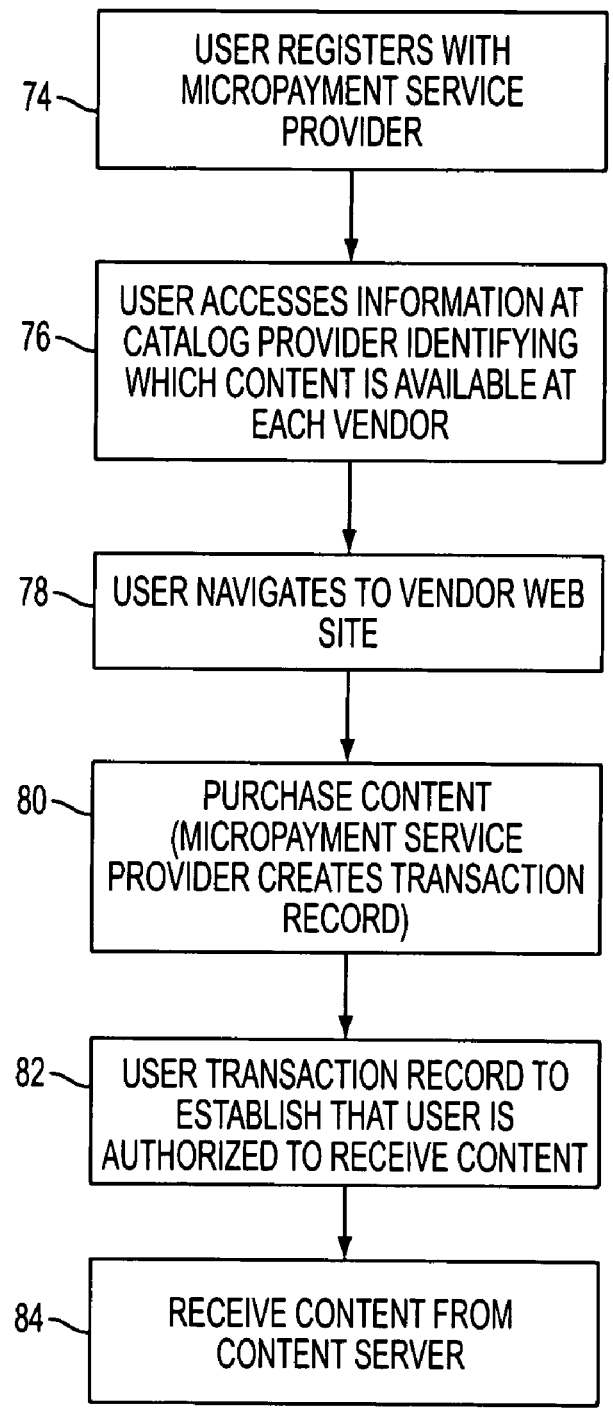
FIG. 6 is a flow chart of illustrative steps involved when a user interacts with the system of FIG. 1 in accordance with the present invention.

Illustrative steps involved in allowing users to interact with system 10 are shown in FIG. 6. At step 74, micropayment service provider computer 20 may be used to provide a user at user device 16 with an opportunity to register with the micropayment service provider over communications network 12. Micropayment service provider computer 20 may, for example, provide a pop-up registration screen for the user on the monitor of user device 16 the first time that the user attempts to purchase a product from a participating vendor. During the registration process (or at a later time when the user logs into the system), micropayment service provider computer 20 may be used to provide the user with on-line options or other suitable opportunities to deposit funds in an account at the micropayment service provider. The user may be provided with an opportunity to deposit an amount of funds (e.g., $20 or more, $50 or more or other suitable amounts) that are substantially in excess of the price associated with a single content item (e.g., $0.05 or $0.10). Funds may be deposited using a credit card, funds transfer from another account, check, etc. By allowing the user to deposit an amount of funds that is substantially greater than the content item price for a single content item purchase transaction, the costs of service charges may be reduced on a per item basis.

Once the registration process has been completed and an account has been established for the user at micropayment service provider computer 20, information may be stored on user device 16 (e.g., in the form of a cookie) that allows the user to bypass the registration process during subsequent purchase transactions.

The user may access information at catalog provider computer 24 at step 76. For example, the user may use a web browser or other suitable software on user device 16 to allow the user to view catalog information on computer 24 that identifies which vendors are selling particular content. If the user is interested in purchasing a newly released song by a favorite artist, the user may search or browse for that artist and song and, when the song has been located, may use the catalog information to determine which vendors are selling that song. The information identifying the vendors that are selling the desired content item may be provided, for example, in the form of selectable web links in the catalog (e.g., on a search results screen). The user may click on one of the web links to be directed to the appropriate vendor's website.

After the user has navigated to the vendor's website (step 78), the user may purchase the desired content item at step 80. The user may, for example, click on a web link that is associated with the desired content item. Clicking on the web link causes vendor computer 22 to launch a SOAP (Simple Object Access Protocol) call or other appropriate software. This connects the user to micropayment service provider computer 20 to proceed with the purchase transaction.

During the purchase transaction of step 80, micropayment service provider computer 20 may create a transaction record that identifies the content item that has been purchased and may create encrypted authentication information for the user to use in downloading the content from content provider computer 14. The authentication information may be made time sensitive to enhance security. The authentication information and other information in the transaction record (e.g., the content identifier, etc.) may be presented to content provider computer 14 at step 82 and used to establish to content provider computer 14 that the user is authorized to download the content that the user has purchased. The user may receive the purchased content over communications network 12 from content provider computer 14 at step 84. This is merely an illustrative content delivery approach. Other suitable techniques may be used to ensure that the content items are securely delivered to the proper users if desired.

Illustrative screens that may be displayed to a user on user device 16 to allow user to make micropayment purchases of downloadable content from content provider computer 14 are shown in FIGS. 7-10. Initially, a user may locate a content item of interest. For example, the user may browse the website of a favorite vendor. Vendor computer 22 may display a web page or other suitable material to the user that offers the content item for sale.

Figure 7:
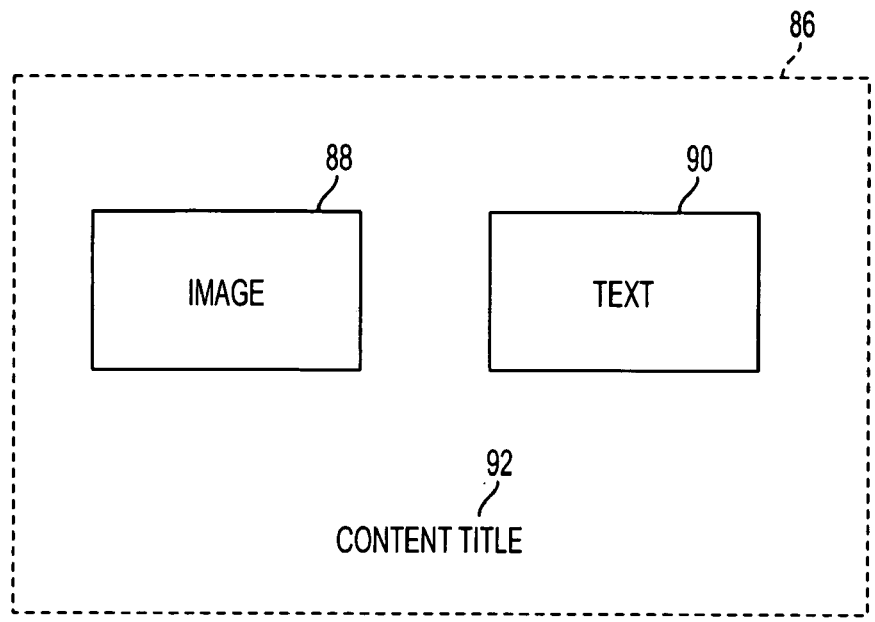
FIG. 7 is an illustrative screen that may be displayed for a user when the user is selecting content to purchase at a vendor website in accordance with the present invention.

As an example, vendor computer 22 may host a web server that provides the user with a web page such as web page 86 of FIG. 7. Web page 86 may include one or more images such as image 88 and text such as text 90. Image 88 may be, for example, an image of a album cover or a movie promo. Text 90 may include a content description. If desired, video and audio content may also be provided with page 86.

A content title that is provided in the form of web link 92 or other selectable option may be used to provide the user with an opportunity to buy the featured content item. When the user selects option 92 of FIG. 7, information is sent from user device 16 to vendor computer 22 that informs vendor computer 22 that the user has selected option 92. This causes vendor computer 22 to run an associated computer program (e.g., a Java script) that initiates the processing of the micropayment transaction. The program may use several parameters that are associated with the particular content title 92 that has been selected. When the user clicks on option 92, the Java program may gather these parameters (e.g., from a database implemented on vendor computer 22). The parameters may include information such as a content identifier (content ID), content title, a description of the content (in addition to the title), the content price, a top-level domain name (URL) that is associated with the vendor (or other suitable vendor identifier), and information that identifies the location where the content is stored (e.g., a particular content provider computer 14). If desired, additional parameters may be gathered or some of these parameters may be omitted (e.g., because they are stored elsewhere in system 10).

Vendor computer 22 passes the content ID and other parameters to micropayment service provider computer 20. Parameters may be passed between the computers of FIG. 1 using the extensible markup language (XML) data format and Simple Object Access Protocol (SOAP) function calls or using any other suitable techniques.

When micropayment service provider computer 20 receives the parameters passed by vendor computer 22, the micropayment service provider computer may use the vendor ID to retrieve the vendor's account information and to verify that the vendor is registered with the micropayment service and is therefore authorized to sell content to the user through the micropayment service. Micropayment service provider computer 20 may then generate a transaction record for the transaction. The transaction record may include a transaction identifier (ID) that identifies the purchase transaction that the user is attempting to make and may include transaction data in the form of the parameters that were passed from vendor computer 22. Micropayment service provider computer 20 may record the transaction ID and the transaction data in a transaction database on the micropayment service provider computer and may then send a function and the transaction ID to user device 16.

Figure 8:
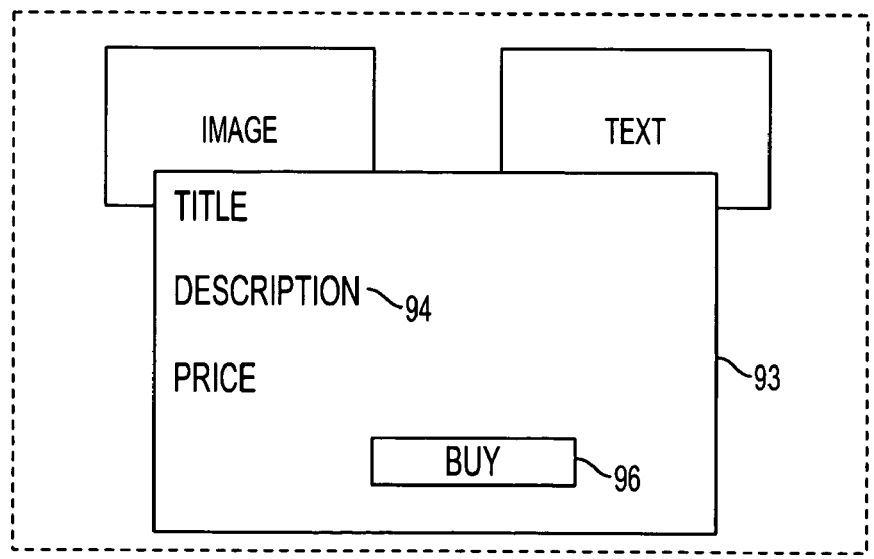
FIG. 8 is an illustrative screen that may be displayed for a user when the user clicks on an option that is associated with a content item that is for sale at the vendor website in accordance with the present invention.

The function that is sent to user device 16 directs the user's device to open a window (or other suitable screen) on the user's device such as window 93 of FIG. 8. The window may include information 94 on the content being purchased (from the transaction record data) and a buy option 96.

The user may select the buy option 96 to purchase the content item using the user's account at micropayment service provider computer 20. If the user has not already logged in to micropayment service provider computer 20, a login screen such as login screen 98 of FIG. 9 may be displayed on user device 16 when the user selects buy option 96.

Login screen 98 provides the user with an opportunity to provide the user's username and password or other suitable user authentication information and to select go option 100 to log in with micropayment service provider computer 20. The user may, for example, log in to the service provider computer 20 from a public computer terminal or the user's personal device. Once logged in, purchases may be made for the remainder of the purchase session without completing login screen 98 again. If desired, a cookie or other data structure may be used to store information on the user's account (e.g., on user device 16). Using such a user account cookie allows the user to make purchases from a number of different vendors associated with the micropayment service provider without being required to repeatedly log in to the system.

If the user is a new user, the user may select new user option 102 from screen 98 to be provided with registration screens by micropayment service provider computer 20 that allow the first-time users to set up an account with the micropayment service provider. Such screens may, for example, allow the user to deposit funds in the user's account using a credit card, by mailing in a check, etc. The new user registration process also allows the user to set up a username and password for use in logging into the system.

When a user selects buy option 96 of FIG. 8, micropayment service provider computer 20 (after allowing a user that is not logged in to log in) may check the user's account to see whether the user has funds (e.g., cash or tokens) available in the user's account that are sufficient to cover the user's desired purchase. If desired, the user may be allowed to incur a debt.

If the user has sufficient funds available to purchase the desired content item, micropayment service provider computer 20 may debit the user's account by the cost price that was listed in window 93 (FIG. 8). The user may then be provided with a confirmation message (e.g., an e-mail or pop-up window such as confirmation window 104 of FIG. 10). Window 104 may merely confirm that the purchase has been completed, or may, if desired, provide the user with selectable download options 106 and 108. With selectable download options 106 and 108, the user may choose to either receive the content item as a file download or as real-time streaming content (or both). The user may click on go option 110 to begin the delivery process or delivery may begin automatically.

During the delivery process, the content item may be provided to user device 16 over communications network 12 from content provider computer 14 or other suitable computer on which the content item is stored. Any suitable technique may be used to authenticate the user's purchase of the content item.

One suitable approach involves providing user device 16 with appropriate content item transaction record purchase authentication information (e.g., an encrypted user ID or other code, a content ID, and content location information such as a URL associated with the content storage location). Micropayment service provider computer 20 may provide this transaction record information directly to the user or this information may be passed to the user through the vendor. The encrypted user ID and other information may also be provided by micropayment service provider computer 20 to the appropriate content provider computer 14. Content provider computer 14 may use the encrypted information (e.g., the encrypted user ID) to lock the desired content item (e.g., by creating a locked zip file). User device 16 may then contact the appropriate content provider computer 14 (or other suitable content item storage location) and may use the encrypted user ID or other suitable transaction record purchase authentication information to obtain the desired content item. The desired content item may be unlocked (e.g., unzipped) at user device 16 using the encrypted authentication information (e.g., the encrypted user ID).

With another suitable approach, transaction record information may be provided primarily to content provider computer 14. This transaction record information may include, for example, a time-stamped transaction ID, information on the content being purchased, the user's delivery address, etc. When content provider computer 14 receives this information from micropayment service provider computer 20, content provider computer 14 may perform an authentication process to check whether the user is authorized to receive the content item. If the purchase transaction is validated, the content may be delivered to the user.

As yet another example, information concerning the transaction may be provided to vendor computer 22 by micropayment service provider computer 20. Vendor computer 22 may then use this information to obtain the appropriate content for the user (e.g., from an appropriate content provider computer 14, local host, or other suitable storage location). With this approach vendor computer 22 may act as an intermediary between the content provider and the user.

These are merely illustrative examples. Once the user has made a micropayment (e.g., a payment on the order of fractions of a dollar to a dollar for typical song purchases or short articles), any suitable technique may be used to consummate the content item download process over communications network 12 in a secure fashion.

The micropayment service provider may charge the vendor involved in the purchase transaction for the micropayment services on a per-item basis or using any other suitable fee arrangement. The micropayment service provider may, if desired, also charge service fees to the content provider or user on a per-item basis or using any other suitable fee arrangement. The vendor may pay a per-item royalty or other suitable royalty or fee to the content owner.

During and following the purchase and download transaction, the databases maintained by the entities in FIG. 1 may be updated. For example, micropayment service provider computer 20 may update its database information to reflect which vendor sold the content, to reflect the new user and vendor account balances, etc. Vendor computer 22 may update its database information to maintain a record of which content was sold, sales price, any transaction fees paid to the micropayment service provider, royalty payments made to the content owner, etc. Content provider computer 14, micropayment service provider computer 20, or vendor computer 22 may provide information on the purchase transaction to catalog provider computer 24, so that catalog provider computer 24 may update its databases. For example, catalog provider computer 24 may update its databases to reflect royalty payment status and amounts, which vendors have sold which content items, the number of content items that have been sold, etc. These are merely illustrative examples of the type of database updates that may be made while operating system 10 to support purchase transactions. Any suitable information may be stored in databases on the computers of FIG. 1 if desired.

Content owners may want to restrict the potential reuse of their content items after they are downloaded. For example, a content owner may want the user who has purchased a content item to be able to reuse it a given number of times, may want to make the content to automatically expire after a certain period of time (for example, one week or one month after the date of purchase), or may wish to prevent the user from making copies of the content and giving them to somebody else who could make free use of the content.

Figure 11:
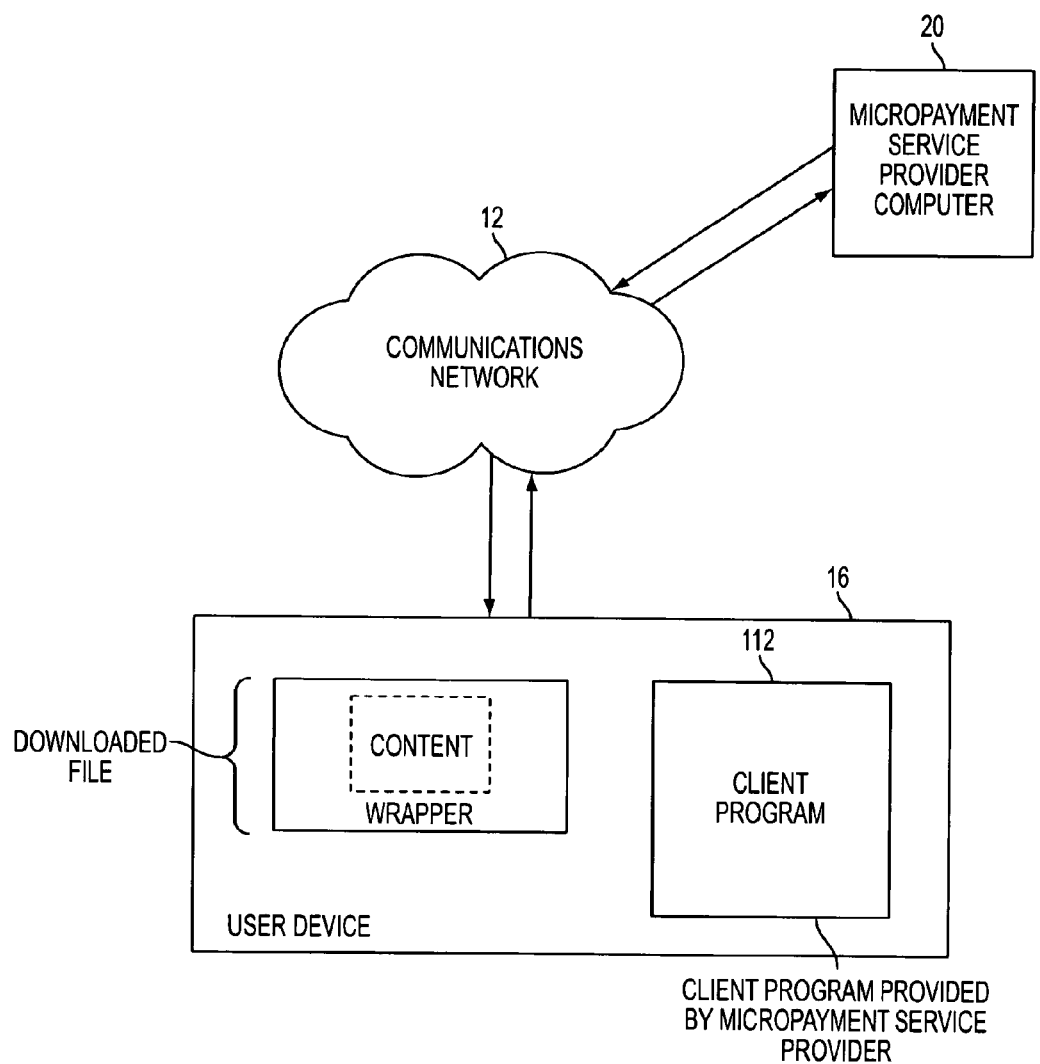
FIG. 11 is a block diagram of an illustrative system that may be used when a user desires to access a content item that has already been purchased and downloaded to the user's computer in accordance with the present invention.

To provide content owners with this type of security and control, the micropayment service provider computer may be used to provide content wrapper software tools to the content owners. The content wrapper tool may be used by the content owners to wrap their content items before they are downloaded to user device 16 for access by the user. To access the content, a user must use client program 112 (FIG. 11) that runs on user device 16 to unwrap the wrapper from the content item, as shown in FIG. 11. The user may download client program 112 from micropayment service provider computer 20.

Figure 12:
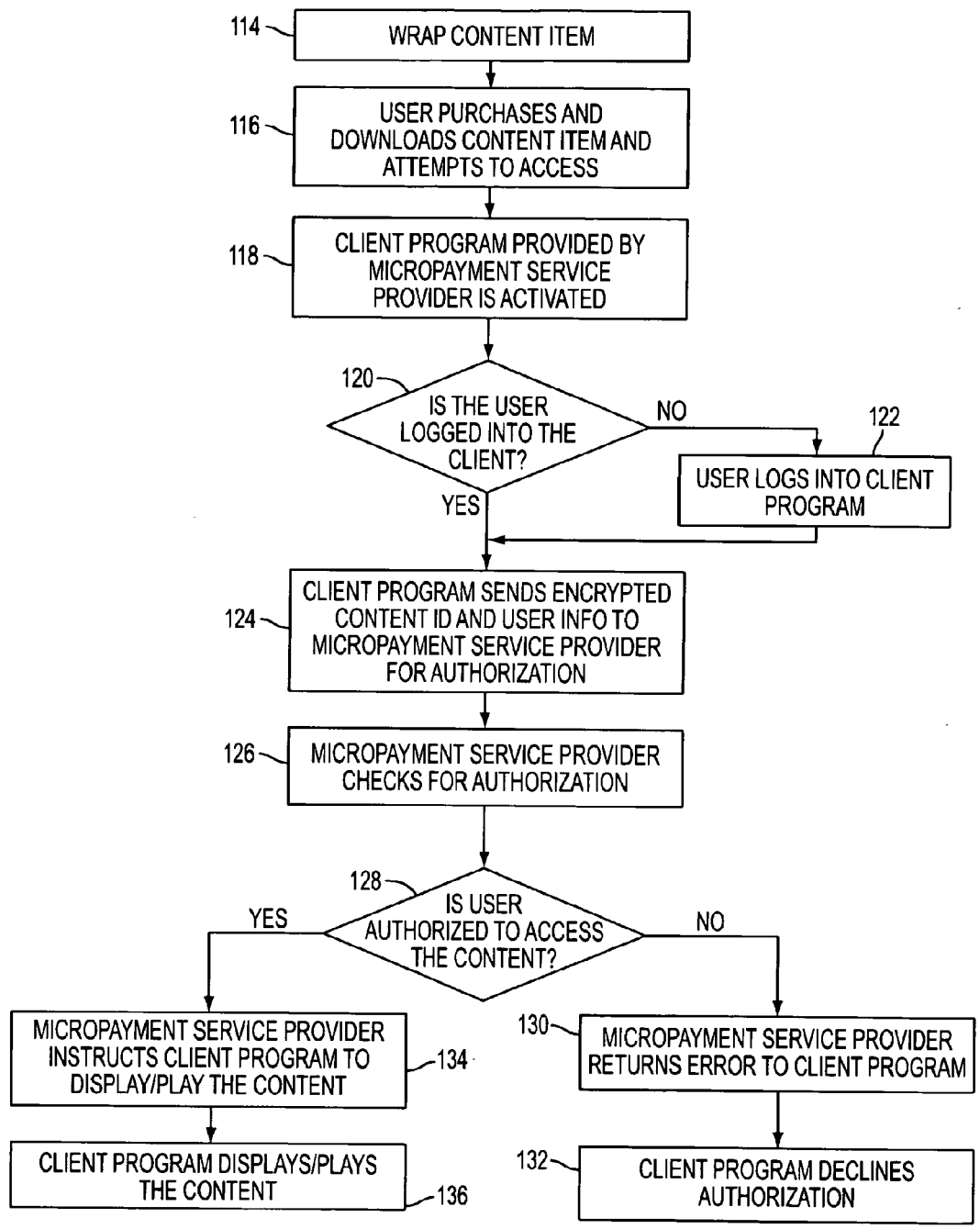
FIG. 12 is a flow chart of illustrative steps involved when a user downloads a file to access content in accordance with the present invention.

Steps involved in using system 10 when content owners wrap content items are shown in FIG. 12. At step 114, a content owner may use a content wrapper tool running on a content provider computer or other suitable computer to wrap content items in a digital wrapper (FIG. 11). At step 116, a user may purchase and download a wrapped content item and may attempt to access that content item (e.g., by clicking on a filename or icon displayed on the user's user device 16).

Figure 9:
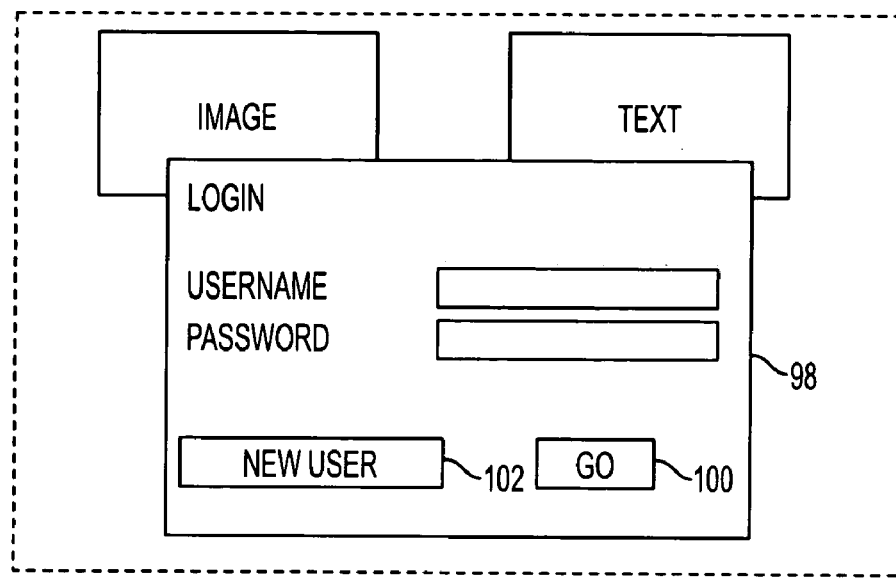
FIG. 9 is an illustrative screen that may be displayed for a user when the user is to log in to a micropayment service provider computer in accordance with the present invention.
Figure 10:
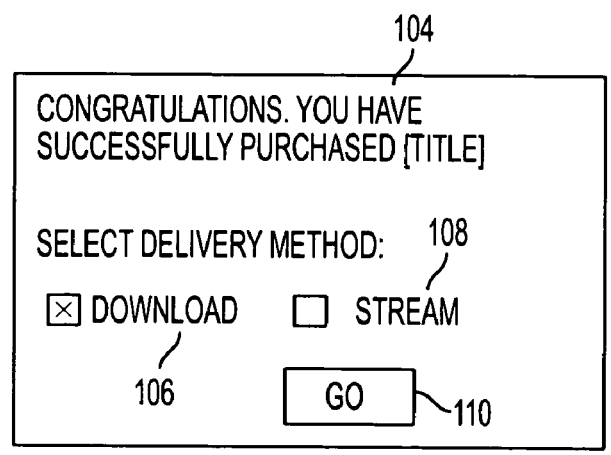
FIG. 10 is an illustrative screen that may be displayed for a user when the user has successfully purchased content in accordance with the present invention.

When the use attempts to access a wrapped content item, client program 112 is launched at step 118 (if program 112 it is not already active). At step 120, client program 112 checks whether the user is already logged into the micropayment service provider. If the user is not logged in, the login process may be performed at step 122 (e.g., using a login screen such as shown in FIG. 9). If the user is already logged in, the process may proceed to step 124.

At step 124, client program 112 may send information identifying the user (e.g., a user ID) and information identifying the downloaded content item (e.g., a content ID) to micropayment service provider computer 12.

At step 126, micropayment service provider computer 20 may use the user ID and content ID to determine whether the user is authorized to access the wrapped content item.

If the user is not authorized (e.g., because the user's license to the content item has expired or because the user is not a valid user), micropayment service provider computer 20 may return an error to client program 112. Client program 112 may display an error message for the user at step 132 and will not open the content item for the user.

If the user is authorized to access the content, micropayment service provider computer 20 may instruct client program 112 to allow the user to access the content item. At step 136, client program 112 may unwrap the wrapped content item so that the user may access the content item (e.g., by viewing the content item or playing the content item on user device 16). If desired, client program 112 may automatically launch a viewing application (such as a media player) and may provide the unwrapped content to the media player. Alternatively, client program 112 may store an unwrapped version of the content item in an appropriate folder on user device 16.

The foregoing is merely illustrative of the principles of this invention and various modifications can be made by those skilled in the art without departing from the scope and spirit of the invention.

The invention claimed is:

1. A method for allowing a user at one of a plurality of user devices to purchase a desired content item over a communications network, wherein the desired content item is owned by one of a plurality of content owners, each of which owns other content items, wherein the content items are stored on at least one content provider computer, wherein information on the content items is maintained in a catalog on a catalog provider computer separate from the content provider computer, wherein a plurality of vendors have a plurality of corresponding vendor websites on corresponding vendor computers, wherein at least a given one of the vendors obtains the information on the desired content item from the catalog before offering the desired content item for sale on the given vendor's website, wherein the vendor communicates with a micropayment service provider computer when the user purchases the desired content item, and wherein the communications network is used for communications between the content provider computer, the catalog provider computer, the vendor computers, the micropayment service provider computer, and the user devices, the method comprising:

maintaining an account of funds by the micropayment service provider computer to be used by the user to make micropayment purchases of the content items over the communications network;

selecting by the user the desired content item for purchase from the given vendor's website, wherein information on the desired content item is included in the catalog maintained on the catalog provider computer;

purchasing the selected desired content item using a portion of the maintained funds, and wherein no payment information is required from or provided by the user to the vendor computer; and debiting the user's account the portion of the funds for the purchase of the desired content item, wherein the user downloads the desired content item over the communications network after the user purchases the desired content item.

2. The method defined in claim 1 further comprising providing the content owners with an opportunity to edit information on the content items in the catalog using the catalog provider computer.

3. The method defined in claim 1 further comprising providing a given content owner with an opportunity to modify which vendors are authorized to sell the content items of that content owner using the catalog provider computer.

4. The method defined in claim 1 further comprising delivering the desired content item over the communications network from the content provider computer to the user device.

5. The method defined in claim 1 further comprising allowing multiple vendors to view content item price information in the catalog using the catalog provider computer.

6. The method defined in claim 1 further comprising allowing the content owners to register with the catalog provider using the catalog provider computer.

7. The method defined in claim 1 further comprising allowing the vendors at the vendor computers to register with the catalog provider using the catalog provider computer.

8. The method defined in claim 1 further comprising generating data for the catalog using the content provider computer.

9. The method defined in claim 1 further comprising generating marketing information for the content owners using the content provider computer.

10. The method defined in claim 1 further comprising providing the users with access to the catalog using the catalog provider computer.

11. The method defined in claim 1 further comprising registering the users and the vendors using the micropayment service provider computer.

12. The method defined in claim 1 further comprising generating transaction data for the user's purchase of the desired content item using the micropayment service provider computer.

13. The method defined in claim 1 wherein the desired content item costs less than one dollar.

14. The method defined in claim 1 further comprising providing a content wrapping tool to at least one of the content owners to use in wrapping the content items, wherein the wrapped content items can only be accessed by a client program on the user's user device if the user is authorized.

15. The method defined in claim 1 wherein at least one of the content items is wrapped, the method further comprising allowing the user at the user device to use a client program on the user device to unwrap the wrapped content item to access the unwrapped content item.

16. The method defined in claim 1 wherein each content item has a content item price, the method further comprising using the micropayment service provider computer to provide the user with an opportunity to deposit an amount of funds in the account that is substantially greater than the content item price.

17. A system for allowing a user at one of a plurality of user devices to purchase a desired content item over a communications network, wherein the desired content item is owned by one of a plurality of content owners, each of which owns other content items, wherein the content items are stored on at least one content provider computer, wherein information on the content items is maintained in a catalog on a catalog provider computer separate from the content provider computer, wherein a plurality of vendors have a plurality of corresponding vendor websites on corresponding vendor computers, wherein at least a given one of the vendors obtains the information on the desired content item from the catalog before offering the desired content item for sale on the given vendor's website, wherein the vendor communicates with a micropayment service provider computer when the user purchases the desired content item, and wherein the communications network is used for communications between the content provider computer, the catalog provider computer, the vendor computers, the micropayment service provider computer, and the user devices, the system comprising:

a micropayment service provider computer that communicates with at least the vendor computers and user devices over the communications network, wherein the given vendor communicates with the micropayment service provider computer during user purchase transactions and accesses information on the desired content item from the catalog maintained on the catalog provider computer and wherein:

the micropayment service provider computer is configured to provide an account of funds to be used by the user to make micropayment purchases of content items over the communications network;

the micropayment service provider computer is configured to allow the user to purchase the desired content item when the user selects the desired content item for purchase from the given vendor's website; and the micropayment service provider computer is configured to debit the user's account when the user purchases the desired content item, wherein the user downloads the desired content item over the communications network after the user purchases the desired content item.

18. The system defined in claim 17 wherein the catalog provider computer is configured to provide the content owners with an opportunity to edit information on the content items in the catalog.

19. The system defined in claim 17 wherein the catalog provider computer is configured to provide a given content owner with an opportunity to modify which vendors are authorized to sell the content items of that content owner.

20. The system defined in claim 17 wherein the content provider computer is configured to deliver the desired content item over the communications network to the user device.

21. The system defined in claim 17 wherein the catalog provider computer is configured to allow multiple vendors to view content item price information in the catalog.

22. The system defined in claim 17 wherein the catalog provider computer is configured to allow the content owners to register with the catalog provider.

23. The system defined in claim 17 wherein the catalog provider computer is configured to allow the vendors at the vendor computers to register with the catalog provider.

24. The system defined in claim 17 wherein the content provider computers are configured to generate data for the catalog.

25. The system defined in claim 17 wherein the catalog provider computer is configured to generate marketing information for the content owners.

26. The system defined in claim 17 wherein the catalog provider computer is configured to provide the users with access to the catalog.

27. The system defined in claim 17 wherein the micropayment service provider computer is configured to register the users and the vendors.

28. The system defined in claim 17 wherein the micropayment service provider computer is configured to generate transaction data for the user's purchase of the desired content item.

29. The system defined in claim 17 wherein the desired content item costs less than one dollar.

30. The method of claim 1 wherein the content items information comprises at least one of sales data, account information, royalty payments.

31. The system of claim 17 wherein the content items information comprises at least one of sales data, account information, royalty payments.

* * * * *